US011645629B2

(12) United States Patent
Leary et al.

(10) Patent No.: US 11,645,629 B2
(45) Date of Patent: May 9, 2023

(54) REAL-TIME VISUALIZATION OF AUTONOMOUS VEHICLE BEHAVIOR IN MOBILE APPLICATIONS

(71) Applicant: GM Cruise Holdings LLC, San Francisco, CA (US)

(72) Inventors: Jessica Leary, San Francisco, CA (US); Jonathon Staff, San Francisco, CA (US); John Logan Anderson, San Francisco, CA (US); Max Meyers, Oakland, CA (US); Pratik Patel, San Francisco, CA (US); Robin Yang, San Francisco, CA (US); Bradley Ryan, San Francisco, CA (US); Josh Berlin, San Francisco, CA (US); Teresa Lin, San Francisco, CA (US); Stanley Shiao, San Francisco, CA (US); Michael Magnoli, San Francisco, CA (US); Chau-Yan Wang, San Francisco, CA (US); Christopher Fry, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 143 days.

(21) Appl. No.: 16/569,488

(22) Filed: Sep. 12, 2019

(65) Prior Publication Data
US 2021/0080279 A1 Mar. 18, 2021

(51) Int. Cl.
*G06Q 10/1093* (2023.01)
*H04W 4/029* (2018.01)
(Continued)

(52) U.S. Cl.
CPC ...... *G06Q 10/1095* (2013.01); *G01C 21/3438* (2013.01); *G01C 21/367* (2013.01);
(Continued)

(58) Field of Classification Search
CPC .. G06Q 10/1095; G06Q 10/063; G06Q 50/30; G06Q 10/02; G01C 21/367;
(Continued)

(56) References Cited

U.S. PATENT DOCUMENTS 9,733,096 B2   8/2017   Colijn et al.
10,444,023 B2  10/2019  Chase et al.
(Continued)

OTHER PUBLICATIONS

International Search Report and Written Opinion for International Application No. PCT/US2019/068342, dated Jul. 31, 2020, 25 pages.

*Primary Examiner* — Rami Khatib
(74) *Attorney, Agent, or Firm* — Polsinelli PC

(57) ABSTRACT

Technologies for providing real-time visualizations of a behavior of an autonomous vehicle (AV) associated with a ride request. In some examples, a method for providing real-time visualizations of a behavior of an AV associated with a ride request can include receiving a user request for a ride from an AV, wherein the user request specifies a pick-up location associated with a user; receiving sensor data from one or more sensors associated with the AV; determining, based on the sensor data, a state and context of the AV while the AV is en route to the pick-up location; and presenting, at a display interface, a map depicting one or more visual indicators of the state and context of the AV, the state and context of the AV including a location of the AV and one or more AV operations.

19 Claims, 11 Drawing Sheets

(51) Int. Cl.
*H04W 4/40* (2018.01)
*G01C 21/34* (2006.01)
*G01C 21/36* (2006.01)
*G07C 5/00* (2006.01)
*G07C 5/02* (2006.01)
*G05D 1/00* (2006.01)

(52) U.S. Cl.
CPC ......... *G01C 21/3676* (2013.01); *G07C 5/008* (2013.01); *G07C 5/02* (2013.01); *H04W 4/029* (2018.02); *H04W 4/40* (2018.02); *G05D 1/0088* (2013.01); *G05D 2201/0213* (2013.01)

(58) Field of Classification Search
CPC ............ G01C 21/3676; G01C 21/3438; G01C 21/3697; G01C 21/3667; G07C 5/008; G07C 5/02; G07C 5/0825; H04W 4/029; H04W 4/40; G05D 1/0088; G05D 2201/0213
See application file for complete search history.

(56) References Cited

U.S. PATENT DOCUMENTS

| | | |
|---|---|---|
| 2012/0191269 A1* | 7/2012 | Chen .................... G05D 1/0038 701/2 |
| 2017/0124781 A1 | 5/2017 | Douillard et al. |
| 2018/0033310 A1* | 2/2018 | Kentley-Klay .... G06K 9/00805 |
| 2018/0082135 A1* | 3/2018 | Crawford ................ G06V 20/56 |
| 2018/0136655 A1* | 5/2018 | Kim ....................... B60N 2/002 |
| 2018/0357907 A1* | 12/2018 | Reiley ................... H04W 4/023 |
| 2019/0111838 A1 | 4/2019 | Hanson et al. |
| 2019/0179976 A1* | 6/2019 | Stroila ................. G08G 1/0112 |
| 2019/0265703 A1* | 8/2019 | Hicok .................... G06Q 50/30 |
| 2020/0232809 A1* | 7/2020 | Rogan .................... H04W 4/029 |
| 2020/0338983 A1* | 10/2020 | Alalao ..................... B60K 35/00 |
| 2020/0349666 A1* | 11/2020 | Hodge ................... G08G 1/017 |
| 2020/0372583 A1* | 11/2020 | Yang ...................... G06Q 40/08 |

* cited by examiner

REAL-TIME VISUALIZATION OF AUTONOMOUS VEHICLE BEHAVIOR IN MOBILE APPLICATIONS

TECHNICAL FIELD

The present disclosure generally relates to tracking and visualizing a state of an autonomous vehicle.

BACKGROUND

An autonomous vehicle is a motorized vehicle that can navigate without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

Autonomous vehicles can be implemented by companies to provide self-driving car services for the public, such as taxi or ride-hailing (e.g., ride sharing) services. The self-driving car services can increase transportation options and provide a flexible and convenient way to transport users between locations. To use a self-driving car service, a user will typically request a ride through an application provided by the self-driving car service. When requesting the ride, the user can define a specific pick-up and drop-off location, which the self-driving car service can use to identify the route of the user and select a nearby autonomous vehicle that is able to provide the requested ride to the user. The self-driving car service can then deploy the autonomous vehicle to pick up and transport the user to the drop-off location. Upon reaching the drop-off location, the user can disembark the vehicle and continue to their final destination.

Unfortunately, the pick-up and drop-off experience of users can be confusing and unclear. For example, when picking up users, autonomous vehicles do not always pull over at the location the user anticipates. This can be due to various reasons including traffic and environment conditions, for example. In addition, current ridesharing applications often do not have accurate vehicle location and wait time information. Thus, users can have a difficult time finding their requested autonomous vehicle at pick-up, and are frequently left searching for their ride when the estimated time of arrival comes and goes. Moreover, current ridesharing applications do not provide contextual information to explain why the vehicle may be behaving in a particular way. As a result, users are often left frustrated when a vehicle is shown as stuck or waiting in an undesirable pick-up location.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for providing intelligent, accurate, and granular vehicle behavior and state information in car service applications. In some aspects, an autonomous vehicle (AV) can implement various sensors and devices to understand its state and surrounding environment, and leverage its knowledge of the AV's state and surrounding environment and its more precise location information to provide a rider real-time (or near real-time) visualizations of, and insights into, the AV's location and behavior as the rider awaits to be picked up by the AV.

For example, the AV can leverage sensors on the vehicle, such as camera sensors, global positioning system (GPS) sensors, radars, light detection and ranging (LIDAR) sensors, and inertial sensors, to provide riders a real-time (or near-real time) visualization of the AV's accurate location and behavior and inform riders about what the AV is experiencing and doing as it travels to the rider's pick-up location. In some examples, the AV can provide such location and contextual information to an application on a rider's device, which can use the information to provide map enhancements such as traffic light information, road conditions, brake light indicators, turn-signal indicators, AV velocity data, steering wheel rotation information, etc. In some examples, the AV can stream to the application on the rider's device a video feed from cameras on the AV. The video feed can depict a scene and/or surrounding environment associated with the AV. Riders can use such map enhancements and video to understand and track a state, location, and behavior of the AV while the AV is en route or waiting.

Figure 1:
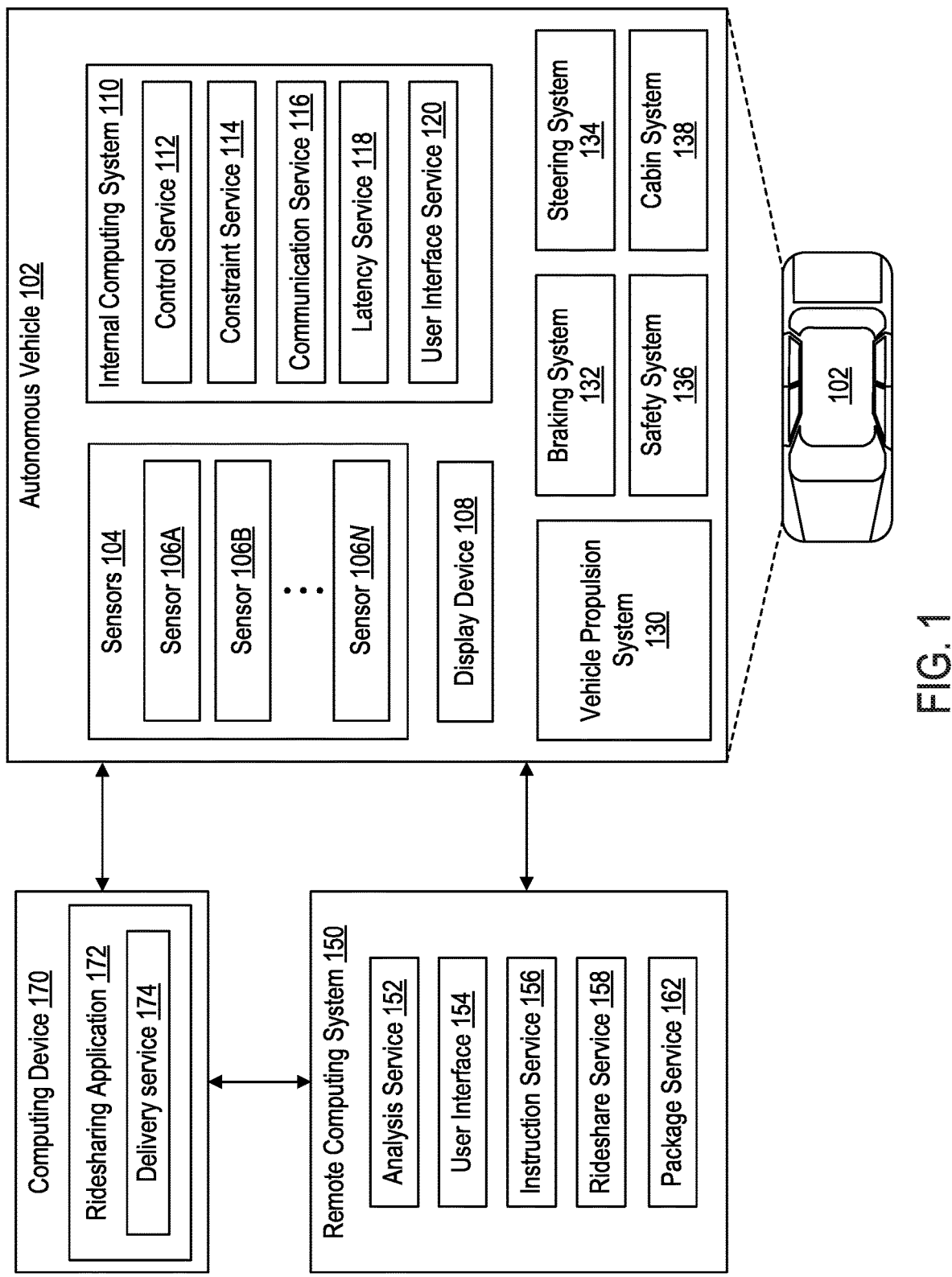
FIG. 1 illustrates an example autonomous vehicle environment including a computing system in communication with an autonomous vehicle, in accordance with some examples.

FIG. 1 illustrates an example autonomous vehicle environment 100. The example autonomous vehicle environment 100 includes an autonomous vehicle 102, a remote computing system 150, and a ridesharing application 172 on a computing device 170. The autonomous vehicle 102, remote computing system 150, computing device 170 (including ridesharing application 172) can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104 on the autonomous vehicle 102. The sensors 104 on the autonomous vehicle 102 can include one or more types of sensors and can be arranged about the autonomous vehicle 102. For example, the sensors 104 can include, without limitation, one or more: inertial measuring units (IMUs), image sensors (e.g., visible light image sensors, infrared image sensors, video camera sensors, etc.), light emitting sensors (e.g., lasers, light detection and ranging sensors (LIDARs), etc.), global positioning system (GPS) devices, radars, sonars, accelerometers, gyroscopes, magnetometers, motion detection sensors, light detectors, audio sensors (e.g., microphones), seat occupancy sensors, seat belt tension or engagement sensors, braking sensors, ultrasonic sensors, position sensors, steering angle sensors, steering wheel rotation sensors, turn signal sensors, parking sensors, gear position sensors, brake light sensors, odometers, speedometers, proximity sensors, temperature sensors, etc.

In some implementations, the sensors 104 can include one or more radars sensors 106A, one or more image sensors 106B (e.g., camera sensors, visible light sensors, infrared light sensors, etc.), and one or more LIDAR sensors 106N. Other implementations can include any other number and types of sensors.

The autonomous vehicle 102 can include one or more display devices 108 for presenting information, such as maps, messages, and interfaces, to passengers in the autonomous vehicle 102. The one or more display devices 108 can be mounted on one or more locations in the autonomous vehicle 102. For example, the one or more display devices 108 can be mounted on one or more seats or headrests in the autonomous vehicle 102, a dashboard in the autonomous vehicle 102, one or more inner sides or door panels on the autonomous vehicle 102, a roof of the autonomous vehicle 102, and/or any other interior location of the autonomous vehicle 102. The one or more display devices 108 can include, for example and without limitation, a screen, a television, a projecting device, and/or any other suitable display device for rendering graphical information.

Moreover, the autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both.

The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, display devices, light-emitting devices, audio systems, etc.

The autonomous vehicle 102 can include an internal computing system 110 in communication with the sensors 104, the display device(s) 108, and the systems 130, 132, 134, 136, and 138. The internal computing system 110 can include one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by the sensors 104 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface system that provides cellular (long-term evolution (LTE), $3^{rd}$ Generation (3G), $5^{th}$ Generation (5G), etc.) communication, Bluetooth communication, near-field communication, and/or any other suitable type of wireless communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to, or receive an instruction from, the autonomous vehicle 102 regarding destinations, requested routes, drop-off locations, wayfinding tasks, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 172 operating on computing device 170. Computing device 170 can include, for example and without limitation, a tablet computer, a laptop computer, a smartphone, a head-mounted display (HMD), a gaming system, a server, a smart device, a laptop computer, a smart wearable (e.g., smart glasses, smart watch, etc.), a mobile computing device, and/or any other computing device. In some cases, the computing device 170 can be a mobile computing device of a user or passenger/rider. Moreover, in some cases, the remote computing system 150 and the autonomous vehicle 102 can also communicate and interact with other computing devices hosting instances of the ridesharing application 172 and the delivery service 174. For example, the remote computing system 150 and the autonomous vehicle 102 can also communicate and interact with other computing devices associated with one or more passengers.

The rideshare service 158 can receive requests from passenger ridesharing application 172, such as user requests to be picked up or dropped off, and can dispatch autonomous vehicle 102 for a requested trip. The rideshare service 158 can also act as an intermediary between the ridesharing application 172 and the autonomous vehicle 102. For example, rideshare service 158 can receive from a passenger instructions for the autonomous vehicle 102, such as instructions to go around an obstacle, change routes, select a drop-off location and/or pick-up location, honk the horn, open doors in the autonomous vehicle 102, etc. The rideshare service 158 can provide such instructions to the autonomous vehicle 102 as requested.

The remote computing system 150 can also include a package service 162 configured to interact with the computing device 170, the ridesharing application 172 and/or a delivery service 174 of the ridesharing application 172. A user operating the ridesharing application 172 can interact with the delivery service 174 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 174 to provide a package identifier to the user for package labeling and tracking. Package delivery service 174 can also inform a user of where to bring their labeled package for drop off. In some examples, a user can request the autonomous vehicle 102 come to a specific location, such as the user's location, to pick up the package. While delivery service 174 has been shown as part of the ridesharing application 172, it will be appreciated by those of ordinary skill in the art that delivery service 174 can be its own separate application.

One example beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2A:
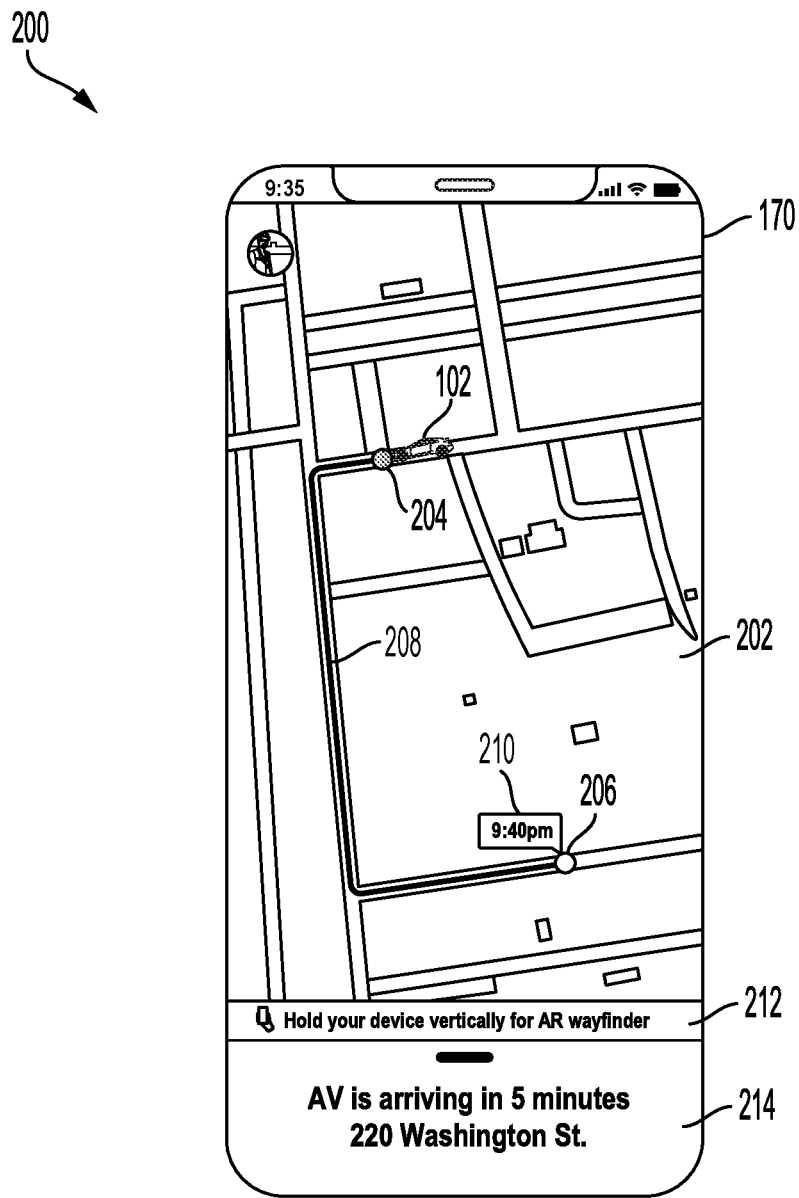
FIGS. 2A and 2B illustrate example interfaces presented on a user's client device for tracking an autonomous vehicle after requesting a ride service, in accordance with some examples.

FIG. 2A illustrates an example interface 200 presented on a user's client device for tracking the autonomous vehicle 102 after requesting a ride service (e.g., 158). The client device can be, for example, a mobile device such as a mobile phone, a tablet computer, a smart wearable, etc. In some examples, the client device can be the computing device 170 shown in FIG. 1. For explanation purposes, the client device hereinafter will be discussed in terms of (e.g., with reference to) the computing device 170 shown in FIG. 1.

The interface 200 can be presented on the client device 170 via an application such as the ridesharing application 172 shown in FIG. 1. Moreover, in some examples, some or all of the information presented in the interface 200 can be based on sensor data (e.g., GPS data, image/video data, radar measurements, LIDAR measurements, inertial measurements, triangulation data, braking sensor data, ultrasonic sensor data, position sensor data, steering angle sensor data, steering wheel rotation sensor data, turn signal sensor data, parking sensor data, gear position sensor data, brake light sensor data, odometer data, speedometer data, accelerometer data, proximity sensor data, temperature measurements, light sensor data, etc.) provided by the autonomous vehicle 102 (e.g., via the internal computing system 110 and/or the remote computing system 150). In some cases, some of the information presented in the interface 200 can also be based on sensor data (e.g., GPS data, triangulation data, image/video data, inertial measurements, etc.) from one or more sensors on the client device 170.

In the example shown in FIG. 2A, the interface 200 can include a map 202 of the area associated with the autonomous vehicle 102 and the user requesting a ride service from the autonomous vehicle 102. The map 202 can display a current location 204 of the autonomous vehicle 102 and a path 208 from the current location 204 of the autonomous vehicle 102 to a pick-up location 206 set for the user/trip. In some cases, the map 202 can also display tracking information such as, for example, an estimated time of arrival 210 to the pick-up location 206, traffic information, route information, etc.

In some implementations, the interface 200 can also include an information section 212 for providing information about the trip, such as vehicle information, traffic information, trip conditions, environment conditions, a state of the autonomous vehicle 102 (e.g., speed, position, trajectory, vehicle conditions, operation state, etc.), a behavior of the autonomous vehicle 102, road conditions, trip alerts, navigation information, user instructions, etc. For example, the information section 212 can display a notification 214 indicating an estimated time of arrival of the autonomous vehicle 102.

In some examples, the autonomous vehicle 102 can provide (e.g., via the internal computing system 110 and/or the remote computing system 150) updated sensor data to the client device 170 as the autonomous vehicle 102 travels from the current location 204 to the pick-up location 206. For example, the autonomous vehicle 102 can provide updated sensor data periodically and/or as any changes occur in the location/position of the autonomous vehicle 102, the state of the autonomous vehicle 102, the behavior and/or operation of the autonomous vehicle 102, road conditions, vehicle conditions, environment conditions, trip conditions, etc.

Figure 2B:
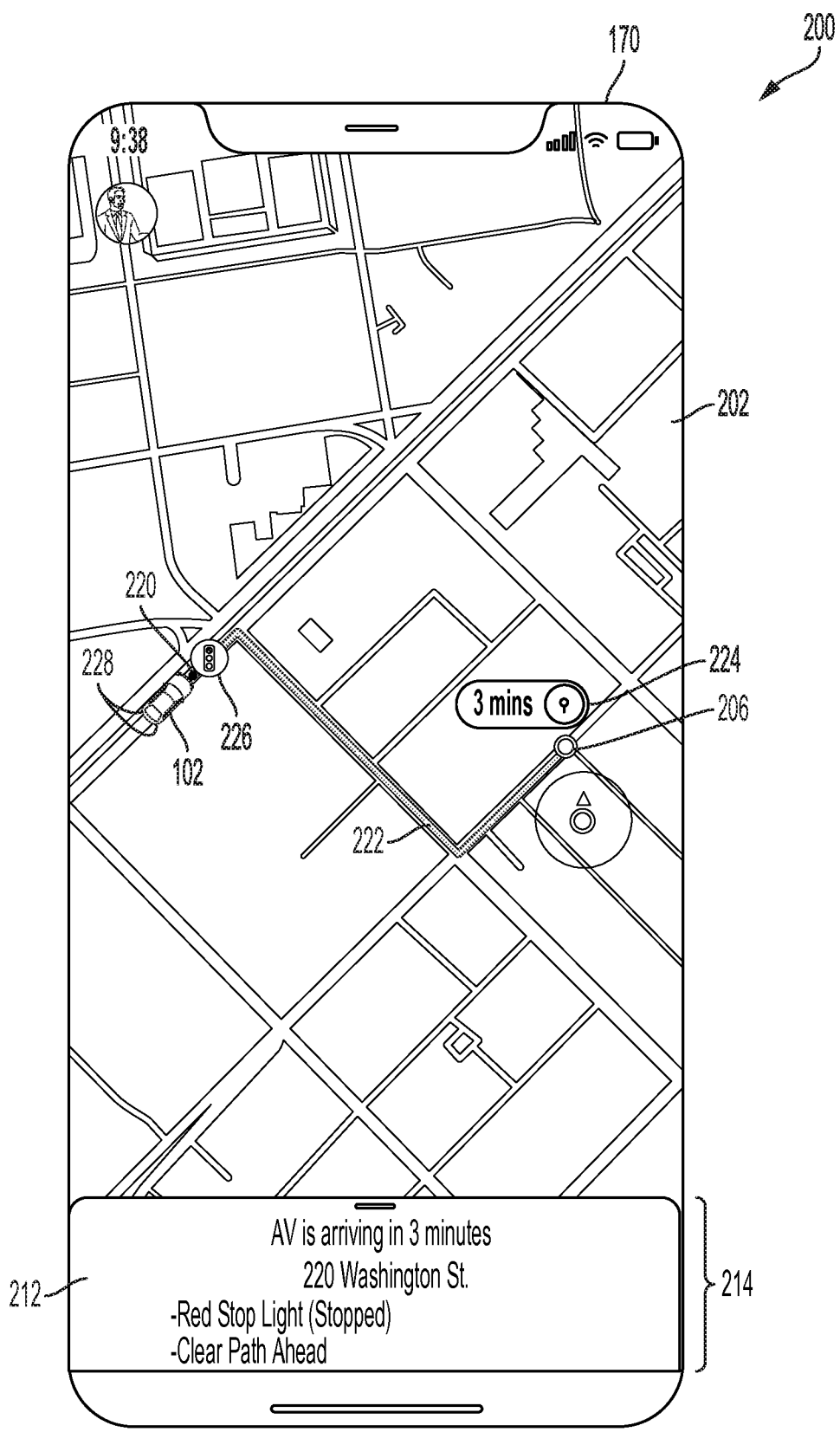

The interface 200 can update the map 202 and/or information presented in the information section 212 based on the updated sensor data provided by the autonomous vehicle 102. For example, with reference to FIG. 2B, as the location of the autonomous vehicle 102 (and/or the relative location/distance between the client device 170 and the autonomous vehicle 102) changes, the interface 200 can update the map 202 and/or the information section 212 to present more current information. To illustrate, the map 202 can present an updated location 220 of the autonomous vehicle 102, an updated path 222 from the updated location 220 of the autonomous vehicle 102 to the pick-up location 206, and an indicator 224 of an updated estimated time of arrival of the autonomous vehicle 102.

In some examples, the interface 200 can also update the map 202 to depict a state of the autonomous vehicle 102, an operation and/or behavior of the autonomous vehicle 102, environment conditions, etc. To illustrate, the map 202 can display a visual indication 228 of a state (e.g., activated, inactivated) of the brake lights on the autonomous vehicle 102 and a traffic light indicator 226 that visually depicts a state of a traffic light (e.g., green light, yellow light, red light) approached by the autonomous vehicle 102. In the example shown in FIG. 2B, the map 202 includes a visual indication 228 of an activated state of the brake lights, which indicates that the autonomous vehicle 102 has implemented the brakes, and a traffic light indicator 226 showing that the autonomous vehicle 102 has approached a red traffic light.

Moreover, in some examples, the interface 200 can update the information section 212 to present new or updated information. For example, the interface 200 can present notifications 214 indicating an estimated time of arrival of the autonomous vehicle 102 and informing the user that the autonomous vehicle 102 is stopped at a red stop light but has a clear path ahead. In some cases, if there are obstructions along the path 222 of the autonomous vehicle 102 or any other conditions relevant to the user/trip, the interface 200 can similarly update the information section 212 to display an indication/description of such obstructions and conditions.

Figure 3A:
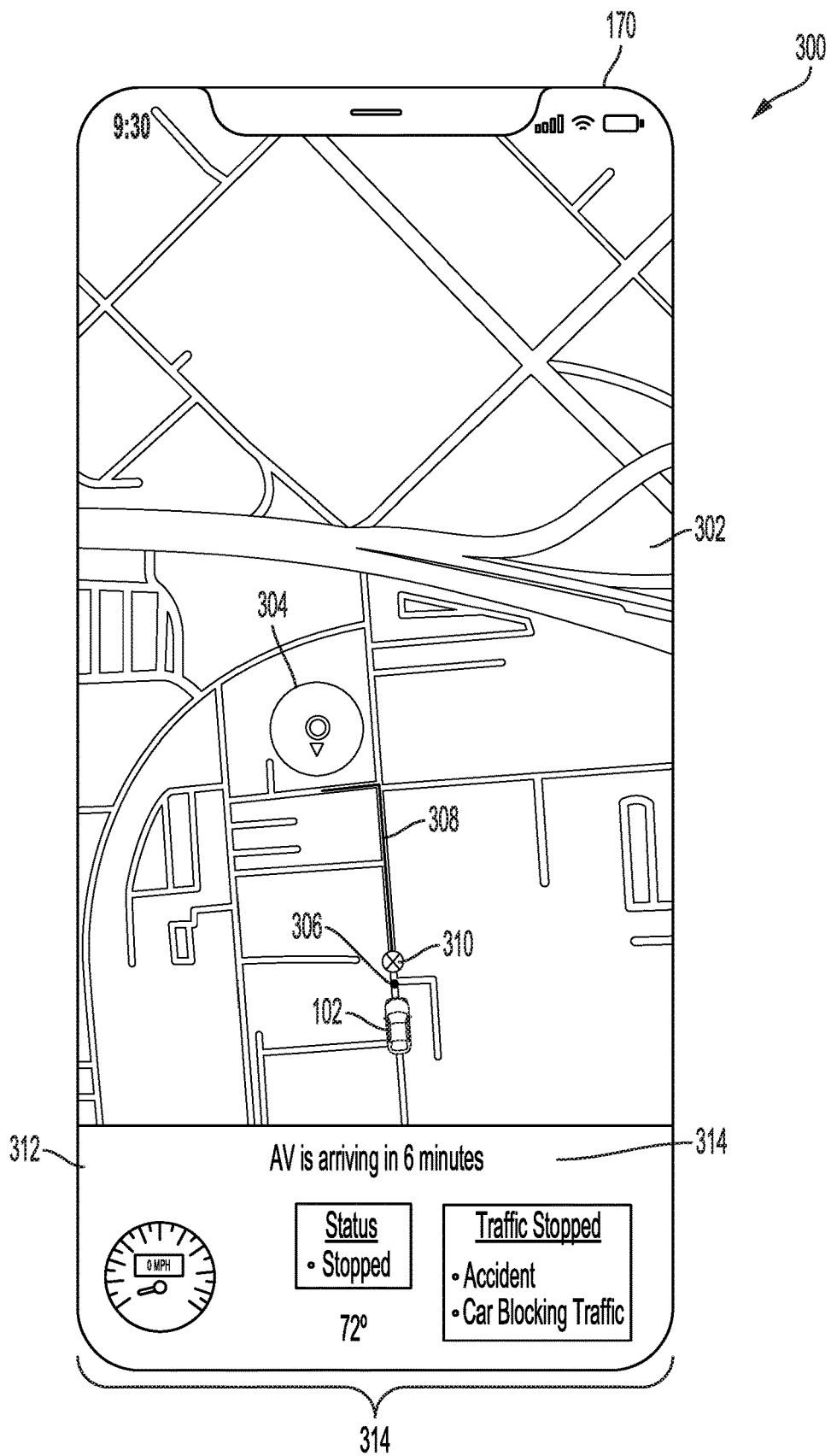
FIGS. 3A through 3D illustrate example interfaces displaying a state of an autonomous vehicle while en route to pick up a user at a pick-up location, in accordance with some examples.

FIG. 3A illustrates interface 300 displaying a state of the autonomous vehicle 102 while en route to pick up a user at a pick-up location 304. The interface 300 can be displayed on the client device 170 via an application such as ridesharing application 172. Moreover, the state of the autonomous vehicle 102 can be determined and displayed based on data from sensors 104 on the autonomous vehicle 102, which can be provided by the autonomous vehicle 102 (e.g., via the internal computing system 110 and/or the remote computing system 150) to the client device 170.

In this example, the interface 300 includes a map 302, which depicts the autonomous vehicle 102 at a current location 306 and a path 308 of the autonomous vehicle 102 from the current location 306 to a pick-up location 304 for the user. The map 302 also depicts an obstruction 310 in the path 308 of the autonomous vehicle 102. The obstruction 310 can indicate to the user that the autonomous vehicle 102 is stopped or will likely have to come to a stop; that the autonomous vehicle 102 may be delayed; and/or a reason why the autonomous vehicle 102 is stopped, will likely have to come to a stop, or may be delayed.

The obstruction 310 can be detected by the autonomous vehicle 102 based on data from sensors 104 on the autonomous vehicle 102. For example, the obstruction 310 can be detected based on an image/video captured by one or more image sensors on the autonomous vehicle 102, radar returns obtained using one or more radars on the autonomous vehicle 102, LIDAR data or a LIDAR point cloud obtained from one or more LIDARs on autonomous vehicle 102, GPS data, motion sensor data, measurements from a structured-light 3D (three-dimensional) scanner on the autonomous vehicle 102, etc. The autonomous vehicle 102 can send to the client device 170 the sensor data and/or information about the obstruction 310 detected based on the sensor data, such as a description of the obstruction 310 (e.g., a location, a depiction, a configuration, an explanation, a report, characteristics, etc.). The client device 170 can use the sensor data and/or information from the autonomous vehicle 102 to display the obstruction 310 on the map and present any other pertinent information at the interface 300.

The obstruction 310 can be any type of obstruction that may be relevant to the user and/or the autonomous vehicle 102. For example, the obstruction 310 can be any type of obstruction that may impact the amount of time it will take the autonomous vehicle 102 to reach the pick-up location 304 from the current location 306 and/or the current time, the path that the autonomous vehicle 102 will or should take from the current location 306 to the pick-up location 304, or how (or if) the autonomous vehicle 102 can/will access the pick-up location 304. Non-limiting examples of obstructions can include road closures, accidents, obstacles (e.g., stalled vehicle, crossing animal, flooding, pot holes, objects, people, road hazards, emergency personnel, etc.), events (e.g., street/road construction, street fairs, concerts, emergencies, sports events, etc.), traffic, etc.

The interface 300 can also include an information section 312 for presenting state information 314 (e.g., vehicle state, environment state, road conditions, surrounding conditions, etc.). The information presented in the information section 312 can include text information (e.g., messages, alerts, notifications, etc.), visual information (e.g., images, icons, animations, video, color, graphical objects, graphical visualizations, etc.), interface elements, etc.

In the example shown in FIG. 3A, the state information 314 presented on the information section 312 include a visual odometer depicting a current speed of the autonomous vehicle 102, a status message indicating that the autonomous vehicle 102 is currently stopped, an alert indicating that traffic is stopped because of an accident that is currently blocking traffic, a temperature of the interior cabin (e.g., 138) of the autonomous vehicle 102, and a notification of an estimated time of arrival of the autonomous vehicle 102.

In other examples, the information section 312 can present other information such as, for example and without limitation, a distance traveled by the autonomous vehicle 102, a remaining distance from the current location 306 of the autonomous vehicle 102 to the pick-up location 304, what gear the autonomous vehicle 102 is currently in, a description or depiction of the obstruction 310, an indication of other state and/or operating parameters of the autonomous vehicle 102 (e.g., a state of any turn-signals or blinkers, a braking state, a state of the brake lights, a steering wheel rotation, a vehicle battery status, a steering angle, etc.), a description or indication of the environment around the autonomous vehicle 102, information alerts, updates, etc.

Figure 3B:
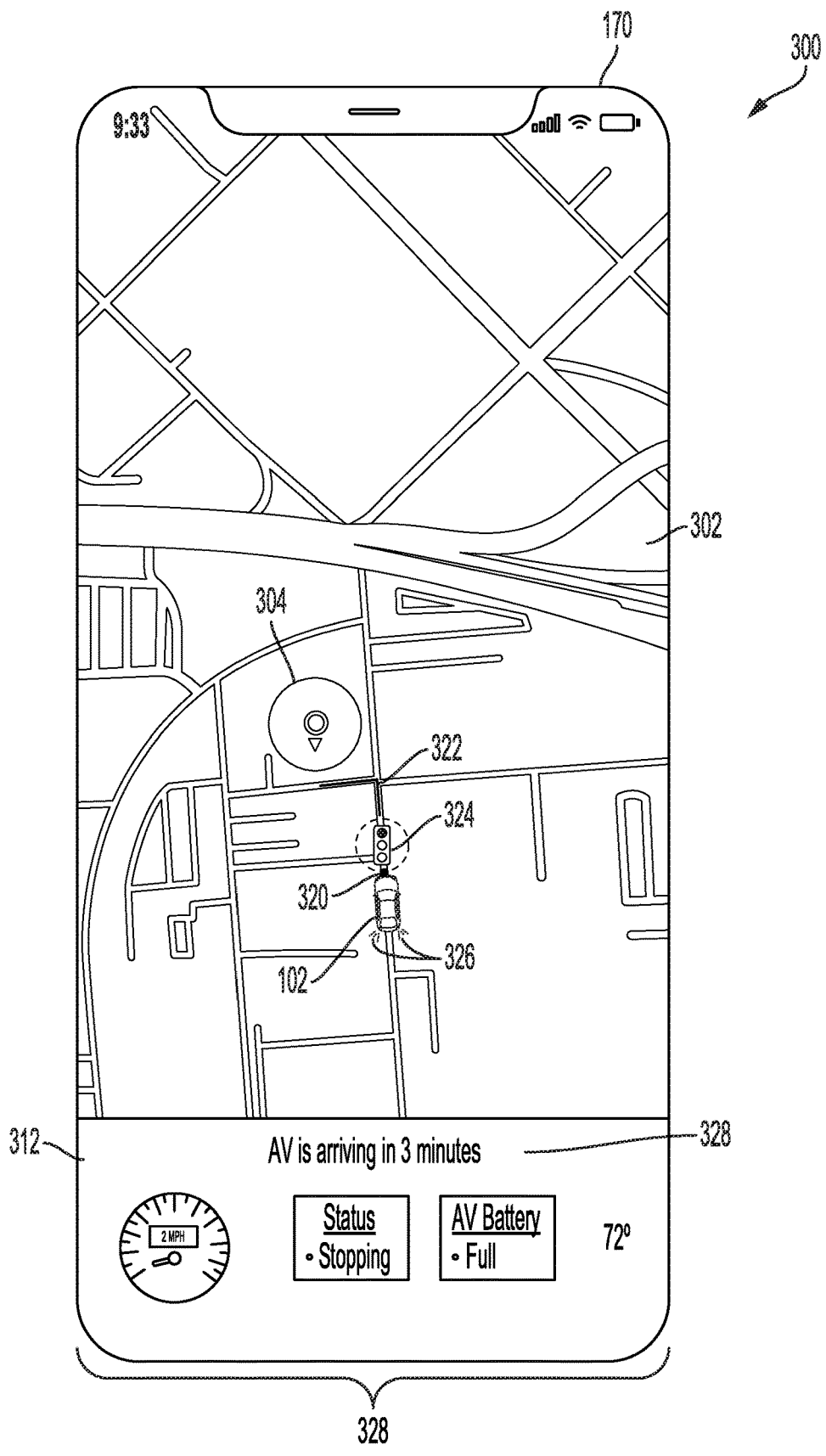

With reference to FIG. 3B, the interface 300 can change or update content presented in the interface 300 to reflect changes in state or circumstances (e.g., changes in the vehicle's location, changes in the environment, changes in the vehicle's behavior, changes in the vehicle's operating state, changes in the vehicle's route to the pick-up location, changes in the vehicle's estimated time of arrival, etc.) and/or provide any other information. The interface 300 can change or update such content based on data provided by the autonomous vehicle 102 (e.g., via the internal computing system 110 and/or the remote computing system 150), such as sensor data as previously explained.

In the example shown in FIG. 3B, the map 302 has been updated to reflect an updated location 320 of the autonomous vehicle 102 and an updated path 322 from the updated location 320 of the autonomous vehicle 102 to the pick-up location 304. The map 302 has also been updated to depict the autonomous vehicle 102 approaching a red traffic light 324 with the brake lights 326 on the autonomous vehicle 102 turned on. The visualization on the map 302 of the autonomous vehicle 102 approaching the red traffic light 324 with the brake lights 326 on can indicate to the user that the autonomous vehicle 102 is coming to a stop for a red traffic light so the user can have a better understanding of why the autonomous vehicle 102 appears to have stopped (or in the process of stopping) and any consequent delays. Thus, the user can better track the autonomous vehicle 102 and obtain a better understanding of the current behavior/operation of the autonomous vehicle 102.

In addition, the information section 312 has been updated to include information 328 about the current state or circumstances associated with the autonomous vehicle 102. In this example, the information 328 includes a visualization of an odometer indicating a current speed of the autonomous vehicle 102, an updated status of the autonomous vehicle 102 (e.g., stopping), a vehicle battery status, a current vehicle temperature, and an updated notification indicating an estimated time of arrival calculated at least partially based on the current state or circumstances associated with the autonomous vehicle 102.

Figure 3C:
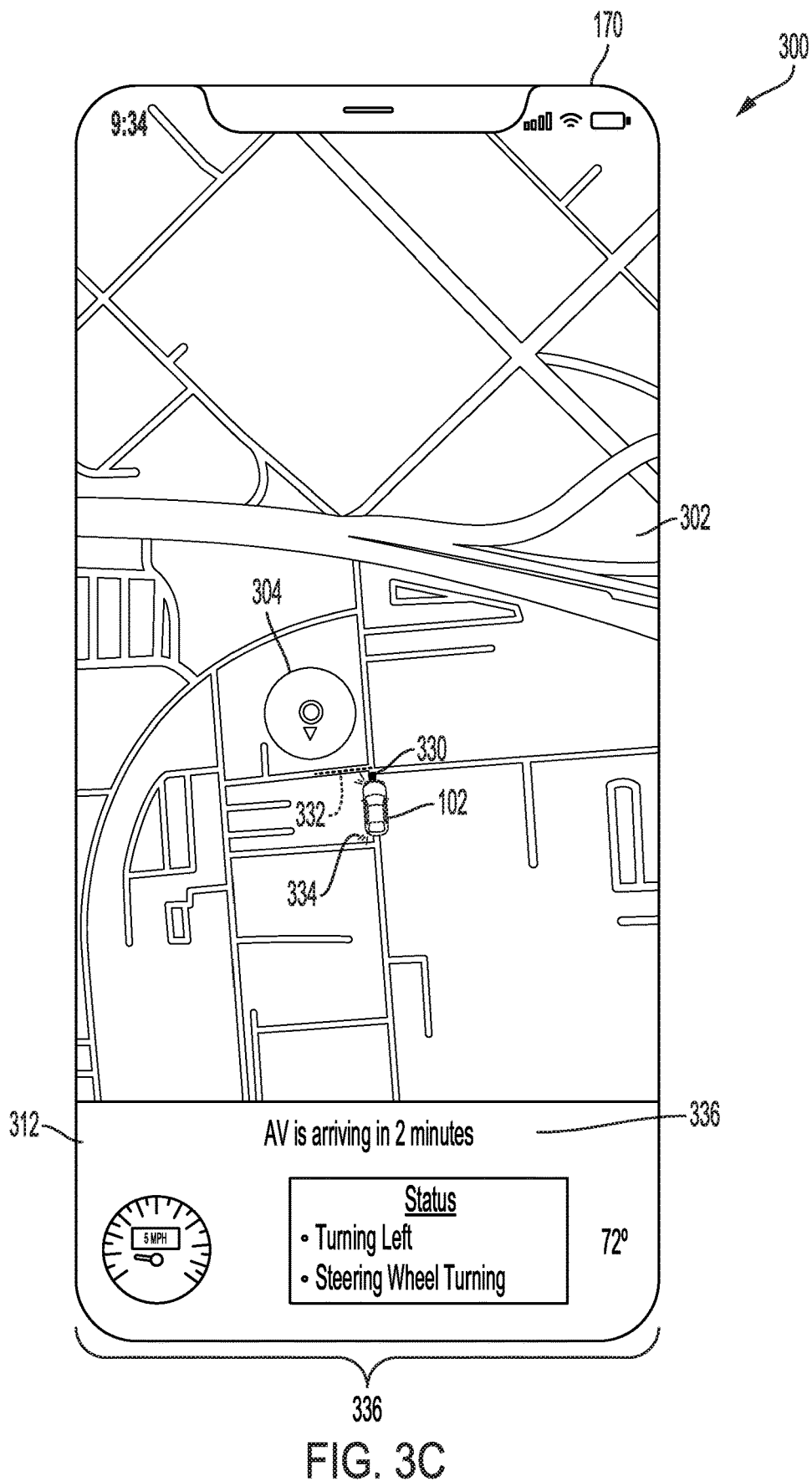

The interface 300 can continue to change or update content presented in the interface 300 when it receives new or updated data from the autonomous vehicle 102. Such changes or updates can reflect any changes in state or circumstances and/or provide any other information, as previously explained. For example, with reference to FIG. 3C, the client device 170 can receive new or updated data from the autonomous vehicle 102 and update the map 302 in the interface 300 to reflect a current location 330 of the autonomous vehicle 102 and a remaining path 332 from the current location 330 of the autonomous vehicle 102 to the pick-up location 304.

In this example, the autonomous vehicle 102 is also depicted in the map 302 with a left-turn signal 334 turned on (e.g., blinking or flashing), indicating that the autonomous vehicle 102 is turning (or preparing to turn) left. The visualization in the map 302 of the left-turn signal 334 can be based on data (e.g., sensor data) received from the autonomous vehicle 102 indicating that the left-turn signal of the autonomous vehicle 102 has been turned on or activated. Such visualization and information can inform the user of the current state/trajectory of the autonomous vehicle 102.

Moreover, the information 336 presented in the information section 312 of the interface 300 has been updated to include an indication (e.g., a visualization of an odometer) of a current speed of the autonomous vehicle 102, a notification of a current status of the autonomous vehicle 102 (e.g., turning left, steering wheel turning), and a current indication of the estimated time of arrival of the autonomous vehicle 102.

The interface 300 can provide any other pertinent information that can inform the user of the state and behavior of the autonomous vehicle 102. For example, with reference to FIG. 3D, the map 302 in the interface 300 has been updated (e.g., based on data received from the autonomous vehicle 102) to depict the autonomous vehicle 102 in its current state, which in this example shows the autonomous vehicle 102 performing a u-turn after passing the pick-up location 304. The map 302 also includes a visual indicator 340 of a u-turn action. If the visualization of the autonomous vehicle 102 performing the u-turn does not clearly convey to the user what exact maneuver is being performed by the autonomous vehicle 102, the visual indicator 340 can provide additional information/context to help the user understand that the autonomous vehicle 102 is performing a u-turn.

Figure 3D:
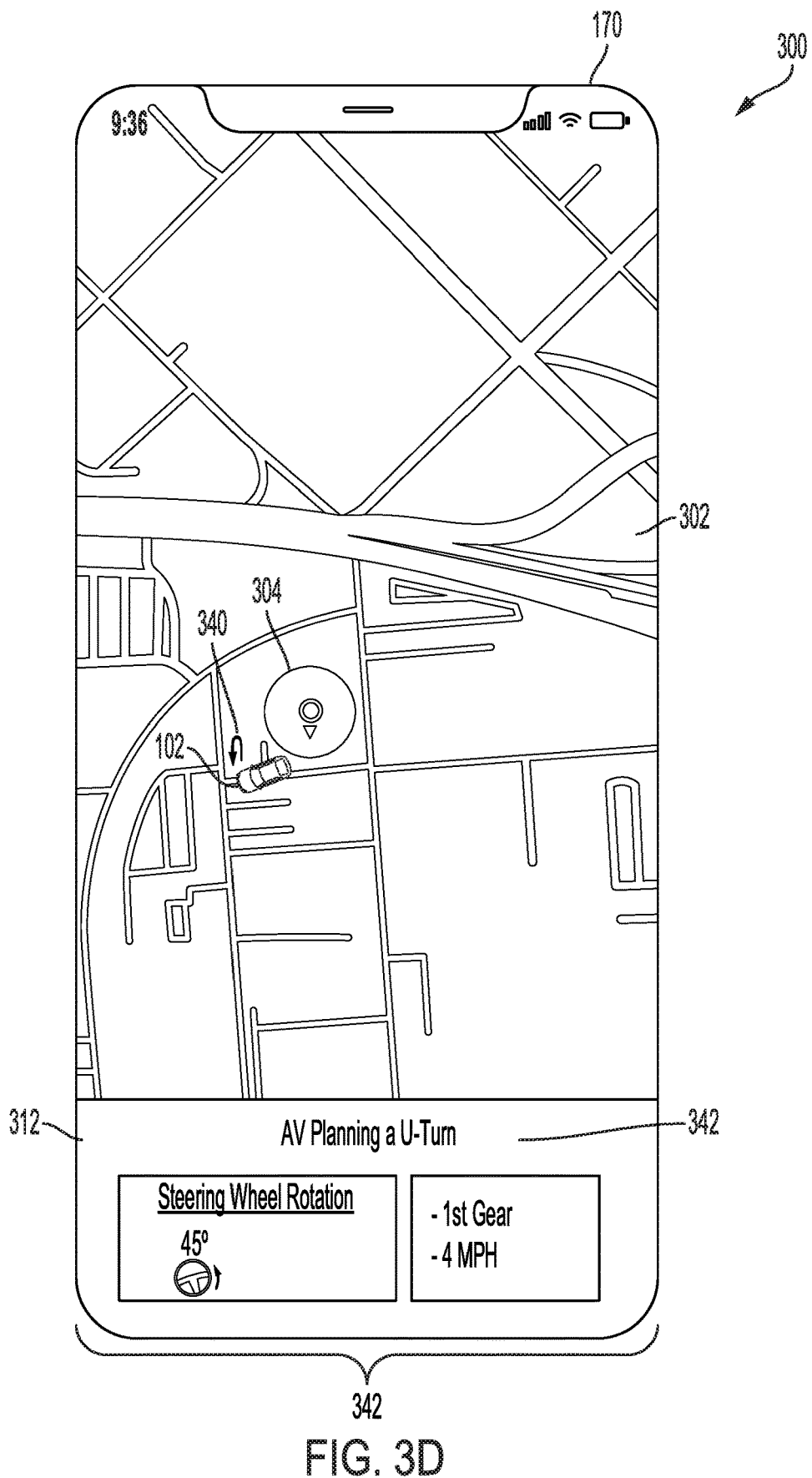

In addition, FIG. 3D shows updated information 342 presented in the information section 312 of the interface 300 to provide additional information/context to the user to help the user understand the current state and circumstances associated with the autonomous vehicle 102. In this example, the updated information 342 includes a message stating that the autonomous vehicle 102 is performing a u-turn; an indication of a steering wheel rotation, which can further inform the user of the current operation of the autonomous vehicle 102 (e.g., the u-turn in process or planned); and a status indicator which provides that the autonomous vehicle 102 is in a first gear and moving at 4 miles per hour. The gear and speed of the autonomous vehicle 102 in this example can again provide the user further state and context information for understand the current and planned operation/behavior of the autonomous vehicle 102.

In some examples, in addition to providing current state and behavior information of the autonomous vehicle 102, the interface 300 can also provide future planned, estimated, or predicted state and behavior information. For example, if the autonomous vehicle 102 switches lanes and slows down prior to reaching an exit along a planned route, the interface 300 can present (e.g., via the map 302 and/or information section 312) visual indicators and/or information indicating that the autonomous vehicle 102 plans to, or is estimated/predicted to, turn into an exit ramp at an upcoming exit. The data used by the interface 300 to provide such information can be provided by the autonomous vehicle 102 (e.g., via the internal computing system 110 and/or the remote computing system 150), as previously explained.

For example, the internal computing system 110 on the autonomous vehicle 102 can analyze a current location of the autonomous vehicle 102, a current velocity of the autonomous vehicle 102, a current direction/trajectory of the autonomous vehicle 102, a planned route, a relative direction to the pick-up location and/or any sensed or identified operations at the autonomous vehicle 102 (e.g., braking, slowing down, speeding up, changing steering angle, changing steering wheel rotation angle, activating a turning signal, etc.) to determine a planned or predicted operation (e.g., turning into the exit ramp) of the autonomous vehicle 102. The internal computing system 110 can then send such information to the client device 170, which can optionally update the interface 300 to provide one or more indications of the planned or predicted operation of the autonomous vehicle 102.

Figure 4:
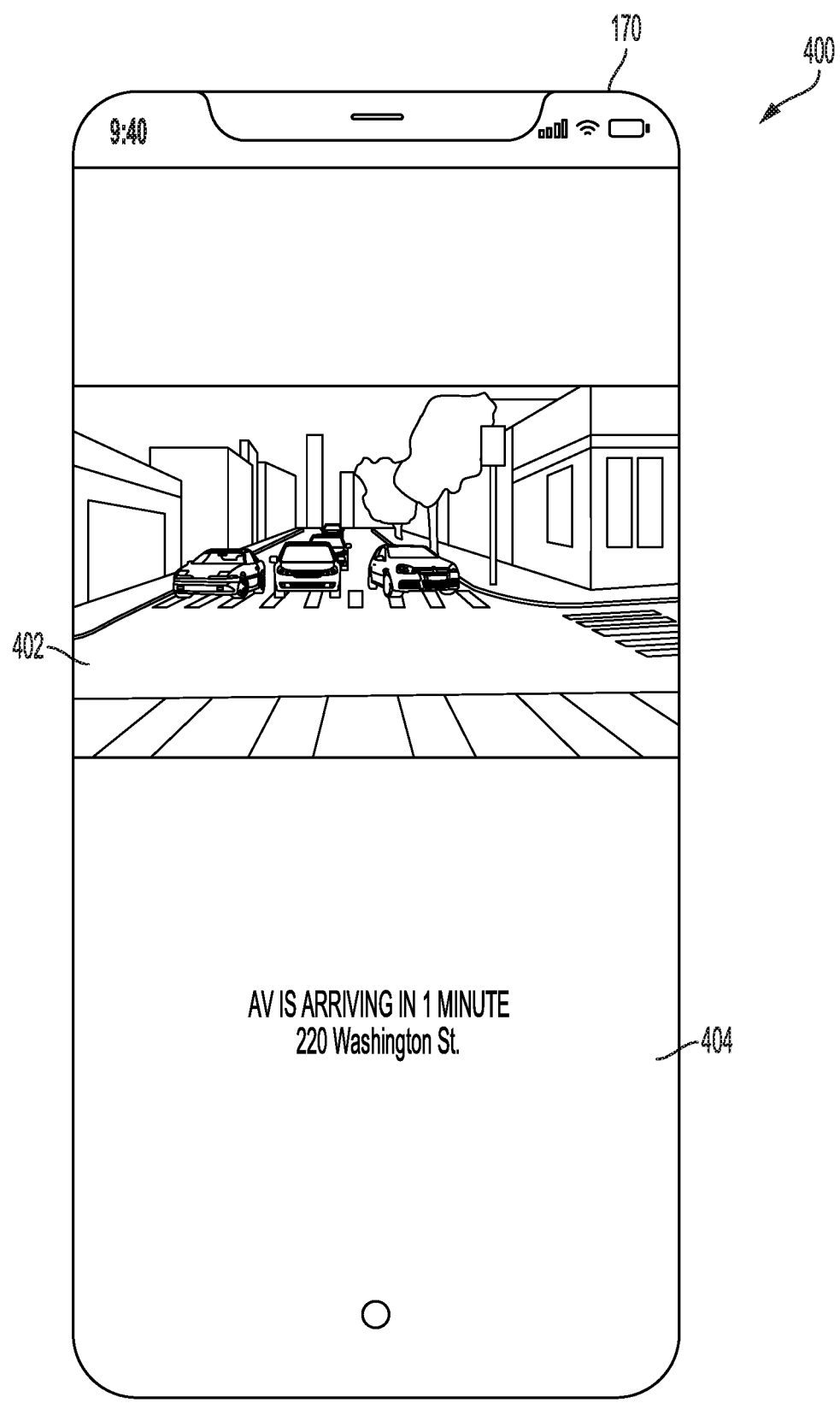
FIG. 4 illustrates an example interface for presenting a video feed from one or more camera sensors on an autonomous vehicle, in accordance with some examples.

FIG. 4 illustrates an example interface 400 for presenting a video feed 402 from one or more camera sensors (e.g., 104) on the autonomous vehicle 102. The interface 400 can be rendered on the client device 170 via an application such as ridesharing application 172. The autonomous vehicle 102 can stream (e.g., via the internal computing system 110) the video feed 402 to the client device 170, which can then present the video feed 402 on the interface 400.

In some cases, the one or more camera sensors can be mounted on an exterior/outside of the autonomous vehicle 102 to capture an environment around the autonomous vehicle 102. The one or more camera sensors can capture video of the environment around the autonomous vehicle 102 as the autonomous vehicle 102 is en route and/or waiting for the user at the pick-up location or a parked location. The autonomous vehicle 102 can obtain the video captured by the one or more camera sensors and stream some or all of the video to the client device 170 for presentation on the interface 400.

The video feed 402 presented on the interface 400 can allow a user to see the environment around the autonomous vehicle 102 and obtain insight into any conditions around the autonomous vehicle 102. This can help the user understand not only the state or status of the autonomous vehicle 102 but also any reasons why the autonomous vehicle 102 may be delayed or deviating from a planned route to the pick-up location. In some cases, the video feed 402 can also help the user understand what the autonomous vehicle 102 is doing as it travels to the pick-up location or waits for the user to find and/or board the vehicle.

In some cases, the client device 170 can display on the interface 400 a 360 degree view of the environment/scene around the autonomous vehicle 102 by stitching together camera footage from multiple camera sensors. For example, the client device 170 (or the internal computing system 110) can stitch together footage from front, back, and side-facing camera sensors to generate a 360 degree view of the environment/scene around the autonomous vehicle 102. In some cases, the client device 170 can also display a third-person view of the autonomous vehicle 102 by overlaying the video to create an impression of the autonomous vehicle 102 driving along as the video progresses.

The interface 400 can also include an information section 404 displaying other content such as notifications, alerts, messages, event descriptions, state information, instructions, and/or any other information. For example, the information section 404 can display messages indicating a current status of the autonomous vehicle 102 and an estimated time of arrival of the autonomous vehicle 102. As another example, the information section 404 can display information correlated to the content being displayed in the video feed 402. To illustrate, the information section 404 can display a message informing the user that the autonomous vehicle 102 will park and wait behind an object identified in the video feed 402, such as another vehicle or a building.

Figure 5:
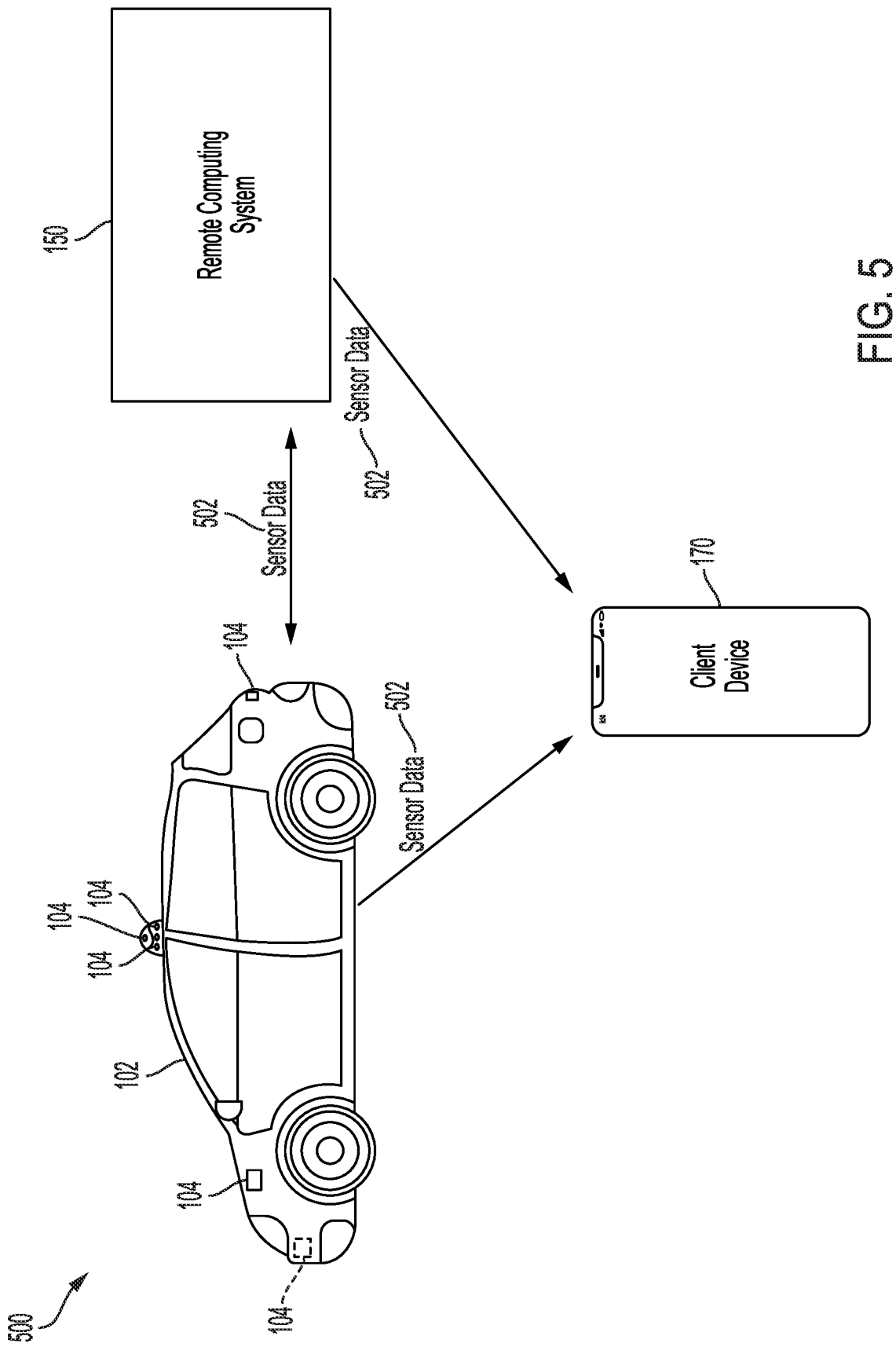
FIG. 5 is a diagram illustrating a streaming of sensor data to a client device for presenting map data and autonomous vehicle state and context information, in accordance with some examples.

FIG. 5 is a diagram illustrating a streaming of sensor data 502 to the client device 170 for presenting map data and AV state and context information as described herein. For example, the client device 170 can use the sensor data 502 to present any of the information in the interfaces 200, 300 and/or 400 shown in FIGS. 2A-B, 3A-D, and 4, respectively.

The sensor data 502 can include data and measurements captured by the sensors 104 on the autonomous vehicle 102. For example, the sensor data 502 can include or reflect measurements or sensed data from one or more image sensors on the autonomous vehicle 102 (e.g., images, video, etc.), one or more LIDARs on the autonomous vehicle 102 (e.g., LIDAR data, LIDAR point cloud information, etc.), one or more radars on the autonomous vehicle 102 (e.g., radar returns, radar return information, etc.), one or more braking sensors on autonomous vehicle 102, one or more brake light sensors on the autonomous vehicle 102, one or more turn signal sensors on the autonomous vehicle 102, one or more speedometers on the autonomous vehicle 102, one or more steering wheel rotation sensors on the autonomous vehicle 102, one or more gear sensors on the autonomous vehicle 102, and/or any other sensors as described herein.

In some cases, the sensor data 502 can include raw sensor measurements and/or information generated based on raw sensor measurements. For example, the sensor data 502 can include raw vehicle acceleration measurements and/or information describing an vehicle acceleration measurements (e.g., data indicating that the autonomous vehicle 102 has accelerated by 5 miles per hour (MPH) and/or that the autonomous vehicle 102 has increased its speed to 30 MPH). As another example, the sensor data 502 can include raw location/position measurements and/or track estimates generated by fusing raw measurements from various sensors and predicting a track of the autonomous vehicle 102 based on the fused sensor measurements. As yet another example, the sensor data 502 can include raw camera sensor footage or processed footage generated based on raw camera sensor footage using one or more image/video processing techniques.

In some cases, the client device 170 can receive some or all of the sensor data 502 from the internal computing system 110 on the autonomous vehicle 102. In other cases, the client device 170 can receive some or all of the sensor data 502 from the remote computing system 150 associated with the autonomous vehicle 102. For example, the internal computing system 110 on the autonomous vehicle 102 can provide the sensor data 502 to the remote computing system 150, which can then provide the sensor data 502 (e.g., as is, after being processed, and/or after being supplemented with other data) to the client device 170. In yet other cases, the client device 170 can receive a portion of the sensor data 502 from the internal computing system 110 on the autonomous vehicle 102 and another portion of the sensor data 502 from the remote computing system 150.

In some cases, the internal computing system 110 on the autonomous vehicle 102 or the remote computing system 150 can process the sensor data 502 prior to providing it to the client device 170. For example, in some cases, prior to providing the sensor data 502 to the client device 170, the internal computing system 110 or the remote computing system 150 can first verify (e.g., check for accuracy, check for relevance, compare with other measurements, curate, etc.) some or all of the sensor data 502. As another example, prior to providing the sensor data 502, in some cases, the internal computing system 110 on the autonomous vehicle 102 or the remote computing system 150 can perform time-event mapping or synchronization to ensure that data provided to the client device 170 is not outdated and synchronized with any events, state, or conditions described/represented by such data.

Moreover, in some cases, the internal computing system 110 on the autonomous vehicle 102 or the remote computing system 150 can calculate and/or vary the time intervals in which sensor data is sent to the client device 170. For example, the internal computing system 110 on the autonomous vehicle 102 or the remote computing system 150 can send sensor data as obtained, at predefined intervals, or at variable intervals. In some cases, the internal computing system 110 on the autonomous vehicle 102 or the remote computing system 150 can send certain type of sensor data at variable intervals which can depend on the lifespan/relevance of the data and/or the network/resource bandwidth.

For example, sensor data describing events that are short-lived or fast paced can be sent at more frequent intervals to ensure such events are adequately conveyed to the client device 170 and/or that such sensor data is sufficiently relevant or synchronized in time with such events. In another example, sensor data describing such short-lived or fast-paced events may not be sent to the client device 170 in some or all instances if such data is estimated to be outdated by the time it reaches the client device 170.

In some cases, prior to providing the sensor data 502 to the client device 170, the internal computing system 110 or the remote computing system 150 can filter out any portions of the sensor data 502. For example, the internal computing system 110 or the remote computing system 150 can filter out portions of the sensor data 502 that are outdated, inaccurate, or not needed by the client device 170. In other examples, prior to providing the sensor data 502 to the client device 170, the internal computing system 110 or the remote computing system 150 can supplement the data with other data from other sources.

For example, the internal computing system 110 can send the sensor data 502 to the remote computing system 150, where the sensor data 502 includes information about the environment around the autonomous vehicle. The remote computing system 150 can receive such sensor data 502 and supplement it with other information about the environment obtained from one or more other sources, such as sensors on other autonomous vehicles in the fleet, the Internet, government sources, news sources, a third-party map/navigation application service, a geographic information system, a data repository associated with the remote computing system 150, etc.

In some cases, the client device 170 can receive the sensor data 502 and process the sensor data 502 to provide the AV state, behavior, and context information described herein. For example, the client device 170 can receive the sensor data 502 and use the sensor data 502 to render such information on a display interface such as interface 200, 300, or 400 shown in FIGS. 2A-B, 3A-D, and 4.

Figure 6:
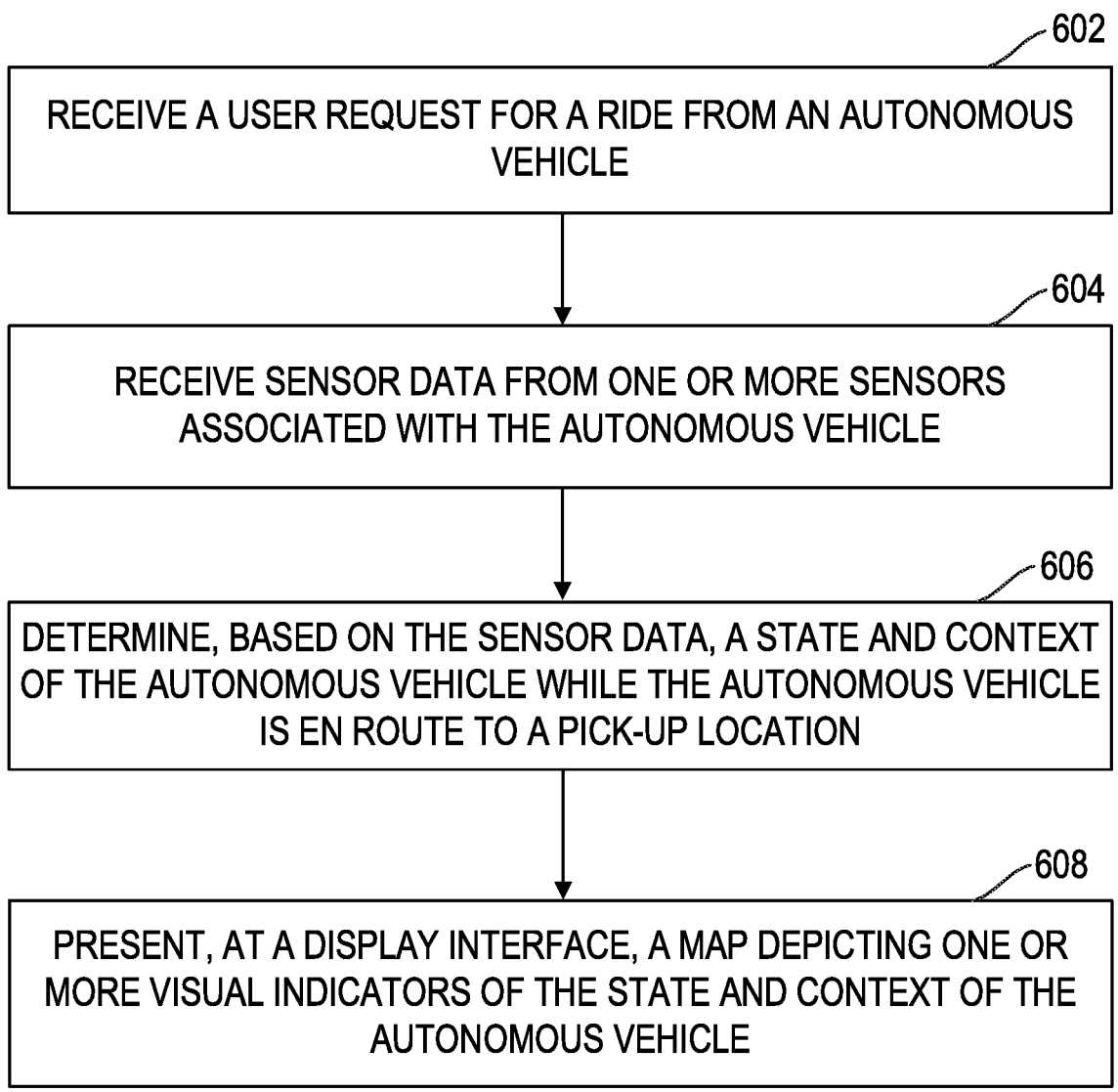
FIG. 6 illustrates an example method for providing real-time or near real-time visualizations of a state and behavior of an autonomous vehicle, in accordance with some examples.

Having disclosed some example system components and concepts, the disclosure now turns to FIG. 6, which illustrates an example method 600 for providing real-time (or near real-time) visualizations of a state and behavior of an autonomous vehicle (102). The steps outlined herein are examples and can be implemented in any combination thereof, including combinations that exclude, add, or modify certain steps.

At step 602, the method 600 can include receiving (e.g., at the client device 170, the remote computing system 150, and/or the internal computing system 110) a user request for a ride from an autonomous vehicle (102). The user request can specify a pick-up location for the requested trip. In some examples, the user request can also specify other information such as a pick-up time, a drop-off location, a final destination of the user, one or more user preferences, user information, a number of riders for the requested ride service, and/or any other trip or user information.

At step 604, the method 600 can include receiving, at the client device (170), sensor data (e.g., 502) from one or more sensors (104) associated with the autonomous vehicle (102). As previously mentioned, the one or more sensors can include, for example and without limitation, one or more image sensors (e.g., camera sensors), LIDARs, radars, GPS sensors, motion detection sensors, speedometers, light detectors, audio sensors, braking sensors, ultrasonic sensors, position sensors, steering angle sensors, steering wheel rotation sensors, turn signal sensors, parking sensors, gear position sensors, brake light sensors, odometers, proximity sensors, structured-light three-dimensional scanners, inertial measurement sensors (e.g., inertial measurement units, gyroscopes, accelerometers, etc.), temperature sensors, and/or any other sensor that can provide information used to determine or verify AV state, behavior, and/or context/environment information.

In some cases, the sensor data can include, for example and without limitation, GPS data, inertial measurements (e.g., motion measurements, pose measurements, acceleration measurements, etc.), image data (e.g., captured images or video depicting a scene/environment around the autonomous vehicle), radar measurements, LIDAR measurements or point cloud information, position measurements (e.g., x, y, z coordinates and/or pitch, roll, yaw measurements), etc. In some cases, the sensor data 502 can include other data such as cellular triangulation data, data indicating a location of a network (e.g., a WIFI network location or Internet Protocol address) to which the client device (170) is connected, data provided by the user, data provided by another user in the autonomous vehicle, Internet data, traffic data, weather data, news report data, etc.

In some examples, the client device (170) can receive other information from the autonomous vehicle (e.g., via the internal computing system 110 and/or the remote computing system 150) in addition to the sensor data. For example, the client device (170) can receive virtual content to overlay on an interface (e.g., 200, 300, 400) or an interface rendering (e.g., map 202, map 302, video feed 402, information section 212, information section 312, information section 404, etc.), messages to display on the client device (170), notifications or alerts to display on the client device (170), images, graphical content, descriptive information, etc.

At step 606, the method 600 can include determining, based on the sensor data, a state and context of the autonomous vehicle while the autonomous vehicle is en route to the pick-up location.

At step 608, the method 600 can include presenting, at a display interface (e.g., 200, 300, 400), a map (e.g., 202, 302, 402) depicting one or more visual indicators (e.g., 220-228, 304-310, 320-326, 330-334, 340, etc.) of the state and context of the autonomous vehicle. The state and context of the autonomous vehicle can include, for example and without limitation, a location of the autonomous vehicle, a behavior of the autonomous vehicle, one or more operations or conditions of the autonomous vehicle, an environment associated with the autonomous vehicle, etc.

In some examples, the state and context of the autonomous vehicle can include one or more AV operations. The one or more AV operations can include, for example and without limitation, driving, reversing, parking, braking, turning, activating or deactivating (e.g., turning on or off, maintaining on or off, etc.) a turn signal, honking a horn, activating or deactivating a brake light, changing a gear (e.g., switching gears), changing a velocity (e.g., increasing or decreasing a vehicle speed), activating or deactivating windshield wipers, changing a route, picking up another rider, stopping (e.g., at a traffic signal or before an object blocking a path), changing driving lanes, performing a u-turn, activating or deactivating any vehicle controls, and/or performing any other maneuver. In some implementations, the map presented at the display interface can depict the autonomous vehicle performing the one or more AV operations.

In further examples, the state and context of the autonomous vehicle can include a temperature in an interior (e.g., cabin 138) of the autonomous vehicle, an AV battery status, a velocity of the autonomous vehicle, a behavior of the autonomous vehicle, a path of the autonomous vehicle to the pick-up location, an environment associated with the autonomous vehicle, one or more conditions in the environment associated with the autonomous vehicle, etc. In some examples, the one or more conditions in the environment associated with the autonomous vehicle can include a traffic condition, a road closure, a traffic accident, a hazard, a traffic signal (e.g., a traffic light, a stop sign, a yield sign, a traffic sign, etc.), an event in the environment, an obstacle along the path of the autonomous vehicle, etc.

Moreover, in some cases, the one or more visual indicators can identify, and/or provide a visualization of, the one or more AV operations, one or more aspects of the one or more AV operations, and/or any other portions/aspects of the state and context of the autonomous vehicle. For example, in some cases, the one or more visual indicators can identify, and/or provide a visualization of, a status of a turn signal (e.g., active or inactive, blinking/flashing, etc.) on the autonomous vehicle, a status of the brake light (e.g., active or inactive, blinking/flashing, etc.) on the autonomous vehicle, a rotation of the steering wheel on the autonomous vehicle, a current gear active at the autonomous vehicle, a gear change at the autonomous vehicle, a u-turn operation, a lane change operation, a reversing operation, a parking operation, an acceleration or deceleration, etc.

In other examples, the one or more visual indicators can identify, and/or provide a visualization of, a temperature in the interior (e.g., cabin 138) of the autonomous vehicle, the AV battery status, a velocity of the autonomous vehicle, a behavior of the autonomous vehicle, a path of the autonomous vehicle to the pick-up location, one or more conditions in the environment associated with the autonomous vehicle, a status of the one or more conditions in the environment associated with the autonomous vehicle, etc. As previously noted, in some examples, the one or more conditions in the environment can include an obstacle along the path of the autonomous vehicle and/or an event in the environment.

In some examples, the obstacle can include, without limitation, a stopped vehicle, an animal, a pot hole, a person, emergency personnel, emergency equipment, a construction, a street fair, flooding, etc. Moreover, in some examples, the event in the environment associated with the autonomous vehicle can include, without limitation, a sporting event, a concert, a traffic signal malfunction, an outdoor event, a nearby conference, a traffic event, etc. In some cases, the one or more visual indicators provide a visual representation of the obstacle along the path of the autonomous vehicle, a visual representation of the event, a visual representation of one or more circumstances associated with the event, etc. Also, in some cases, the map can depict one or more aspects of the environment associated with the autonomous vehicle such as, for example, a landscape, a view, a condition, an object, a setting, a situation or circumstance, a state, a context, etc.

In some cases, the method 600 can further include tracking, based on additional sensor data from the one or more sensors associated with the autonomous vehicle, the state and context of the autonomous vehicle while the autonomous vehicle is en route to the pick-up location and/or waiting for the user; and presenting, on the map, one or more updated visual indicators of an updated state and context of the autonomous vehicle. In some examples, the updated state and context of the autonomous vehicle can include, without limitation, an updated location of the autonomous vehicle, an updated behavior of the autonomous vehicle, and one or more conditions in a current environment associated with the autonomous vehicle, one or more current operations of the autonomous vehicle, one or more current controls of the autonomous vehicle, one or more current conditions of the autonomous vehicle, etc.

In some cases, the method 600 can also include presenting, at the display interface, an information section (e.g., 212, 312, 404) that provides a description of one or more aspects of the state and context of the autonomous vehicle, trip information (e.g., statistics, duration, estimated time of arrival, conditions, route, events, etc.), one or more notifications, a status of one or more autonomous vehicle controls (e.g., brake lights, turn signals, steering wheel, brakes, windows, doors, navigation controls, pedal, gears, mechanical control systems, etc.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 7:
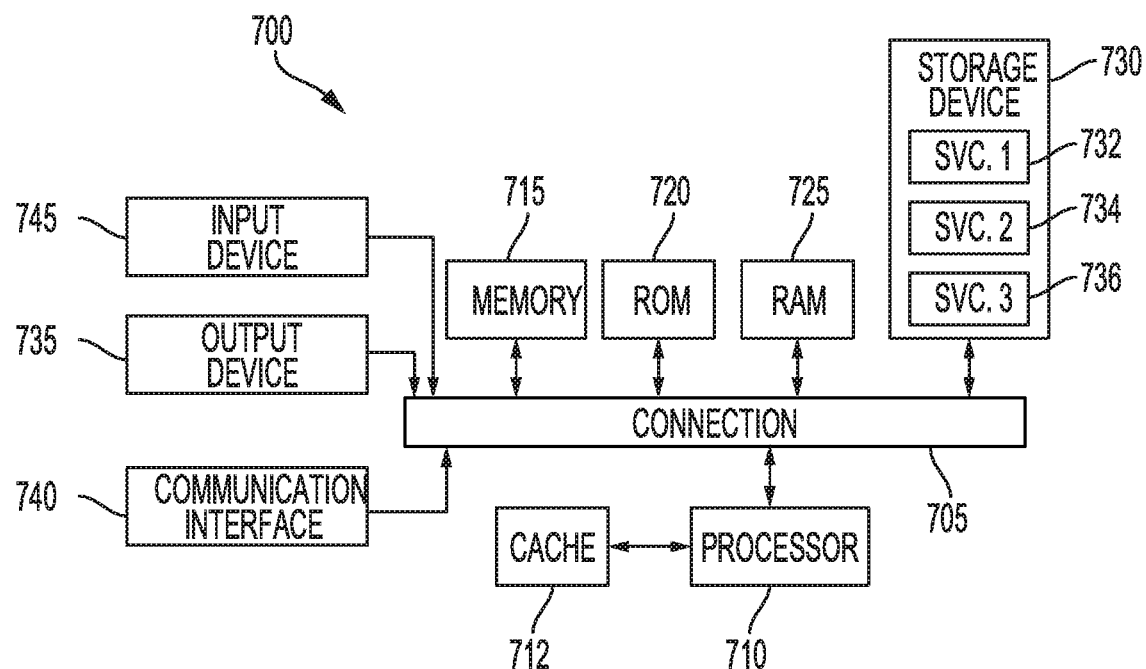
FIG. 7 illustrates an example computing system architecture for implementing various aspects of the present technology.

FIG. 7 illustrates an example computing system 700 which can be, for example, any computing device making up internal computing system 110, remote computing system 150, a client device (e.g., 170) executing rideshare application 172, or any other computing device. In FIG. 7, the components of the computing system 700 are in communication with each other using connection 705. Connection 705 can be a physical connection via a bus, or a direct connection into processor 710, such as in a chipset architecture. Connection 705 can also be a virtual connection, networked connection, or logical connection.

In some implementations, computing system 700 is a distributed system in which the functions described in this disclosure can be distributed within a datacenter, multiple data centers, a peer network, etc. In some implementations, one or more of the described system components represents many such components each performing some or all of the function for which the component is described. In some implementations, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some implementations, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving a user request from a user device for a ride from an autonomous vehicle (AV), wherein the user request specifies a pick-up location associated with a user;
receiving data indicating at least one of a state and a context of the AV while the AV is traveling to the pick-up location;
generating, based on the data indicating the at least one of the state and the context of the AV, one or more visual indicators that indicate the at least one of the state and the context of the AV;
providing a map to the user device depicting the one or more visual indicators of the at least one of the state and the context of the AV, the one or more visual indicators providing a description of at least one of a condition along a route to the pick-up location detected by the AV while traveling to the pick-up location, a response to the condition that the AV is predicted to perform, and a control function that is being performed or has been performed by the AV while traveling to the pick-up location;
determining, based on sensor data from one or more sensors associated with the AV, a change in the at least one of the state and the context of the AV, the change occurring while the AV is traveling to the pick-up location;
providing, to the user device, one or more updated visual indicators identifying the change in the at least one of the state and the context of the AV, wherein the one or more updated visual indicators identify at least one of a status of a turn signal on the AV, a status of a brake light on the AV, a steering wheel rotation measurement of a steering wheel on the AV, and a u-turn operation;
receiving a video feed captured by one or more camera sensors on the AV, the video feed depicting a local scene associated with the AV;
identifying a parking location for the user to enter the AV;
identifying an object in the video feed corresponding to the pick-up location for the user to enter the AV; and
providing, to the user device, the video feed and a message identifying the object as the parking location for the user to enter the AV within the pick-up location, wherein the user device concurrently displays the video feed and the message identifying the object as the parking location for the user to enter the AV.

2. The method of claim 1, wherein the response to the condition or the control function comprise at least one of reversing, parking, braking, turning, activating a turn signal, activating a brake light, and performing a u-turn,
wherein the map presented at the user device depicts the one or more visual indicators while the AV is traveling to the pick-up location.

3. The method of claim 1, wherein the at least one of the state and the context of the AV comprises at least one of a temperature in an interior of the AV, an AV battery status, a velocity of the AV, a behavior of the AV, and an environment associated with the AV, wherein the condition comprises at least one of traffic, a road closure, a traffic accident, a hazard, a traffic signal, an event in the environment associated with the AV, and an obstacle along a path of the AV.

4. The method of claim 3, wherein the one or more visual indicators identify at least one of the temperature in the interior of the AV, the AV battery status, and the behavior of the AV.

5. The method of claim 3, wherein the obstacle along the path of the AV comprises at least one of a stopped vehicle, an animal, a pot hole, a person, emergency personnel, emergency equipment, a construction zone, a street fair, and flooding, wherein the event in the environment associated with the AV comprises at least one of a sporting event, a concert, a traffic signal malfunction, an outdoor event, and a nearby conference, wherein the one or more visual indicators provide a visual representation of at least one of the obstacle along the path of the AV and one or more circumstances associated with the event in the environment.

6. The method of claim 3, wherein the map depicts one or more aspects of the environment associated with the AV, the method further comprising:
presenting, at the user device, an information section providing at least one of trip information, one or more notifications, and a status of one or more AV controls.

7. The method of claim 1, wherein at least a portion of the data indicating the at least one of the state and the context of the AV corresponds to the sensor data from the one or more sensors, wherein the one or more sensors comprise at least one of a camera sensor, a light detection and ranging (LIDAR) sensor, a radar sensor, a global positioning system (GPS) sensor, an accelerometer, a motion detection sensor, a speedometer, a light detector, an audio sensor, a braking sensor, an ultrasonic sensor, a position sensor, a steering angle sensor, a steering wheel rotation sensor, a turn signal sensor, a parking sensor, a gear position sensor, a brake light sensor, an odometer, a proximity sensor, a structured-light three-dimensional scanner, an inertial measurement unit, and a temperature sensor, and wherein the at least the portion of the data comprises at least one of an inertial measurement, GPS data, image data, a steering wheel rotation measurement, a measured velocity, a LIDAR point cloud, a radar return measurement, a detected turn signal status, a detected parking status, a detected gear position, a detected brake light status, a proximity measurement, structured-light three-dimensional scanner data, and LIDAR data.

8. The method of claim 1, further comprising:
tracking, based on the sensor data from the one or more sensors associated with the AV, the at least one of the state and the context of the AV while the AV is en route to the pick-up location; and
presenting, on the map, at least one updated visual indicator of at least one of an updated state and an updated context of the AV, the at least one of the updated state and the updated context of the AV comprising at least one of an updated location of the AV, an updated behavior of the AV, and one or more conditions in an environment associated with the AV.

9. The method of claim 1, wherein the video feed comprises a 360° external view of the AV.

10. The method of claim 1, wherein the AV provides the video feed directly to the user based on the AV being within a communication range of the user.

11. A system comprising:
one or more processors; and
memory having instructions stored thereon which, when executed by the one or more processors, cause the one or more processors to:

receive a user request from a user device for a ride from an autonomous vehicle (AV), wherein the user request specifies a pick-up location associated with a user;

receive data indicating at least one of a state and a context of the AV while the AV is traveling to the pick-up location;

generate, based on the data indicating the at least one of the state and the context of the AV, one or more visual indicators that indicate the at least one of the state and the context of the AV;

provide a map to the user device depicting the one or more visual indicators of the at least one of the state and the context of the AV, the one or more visual indicators providing a description of at least one of a condition along a route to the pick-up location detected by the AV while traveling to the pick-up location, a response to the condition that the AV is predicted to perform, and a control function that is being performed or has been performed by the AV while traveling to the pick-up location;

determine, based on sensor data from one or more sensors associated with the AV, a change in the at least one of the state and the context of the AV, the change occurring while the AV is traveling to the pick-up location;

provide, to the user device, one or more updated visual indicators identifying the change in the at least one of the state and the context of the AV, wherein the one or more updated visual indicators identify at least one of a status of a turn signal on the AV, a status of a brake light on the AV, a steering wheel rotation measurement of a steering wheel on the AV, and a u-turn operation;

receive a video feed captured by one or more camera sensors on the AV, the video feed depicting a local scene associated with the AV;

identify a parking location for the user to enter the AV;

identify an object in the video feed corresponding to the pick-up location for the user to enter the AV; and provide, to the user device, the video feed and a message identifying the object as the parking location for the user to enter the AV within the pick-up location, wherein the user device concurrently displays the video feed and the message identifying the object as the parking location for the user to enter the AV.

12. The system of claim 11, wherein the response to the condition or the control function comprise at least one of reversing, parking, braking, turning, activating a turn signal, activating a brake light, and performing a u-turn, wherein the map depicts the AV performing at least one of the response to the condition or the control function.

13. The system of claim 11, wherein the at least one of the state and the context of the AV comprises at least one of a temperature in an interior of the AV, an AV battery status, a velocity of the AV, a behavior of the AV, a path of the AV to the pick-up location, an environment associated with the AV, and one or more conditions in the environment associated with the AV, wherein the condition comprises at least one of traffic, a road closure, a traffic accident, a hazard, a traffic signal, an event in the environment associated with the AV, and an obstacle along the path of the AV.

14. The system of claim 13, wherein the one or more visual indicators identify at least one of the temperature in the interior of the AV, the AV battery status, and the behavior of the AV.

15. The system of claim 13, wherein the obstacle along the path of the AV comprises at least one of a stopped vehicle, an animal, a pot hole, a person, equipment, a construction zone, a street fair, and flooding, wherein the event in the environment associated with the AV comprises at least one of a sporting event, a concert, a traffic signal malfunction, an outdoor event, and a nearby conference, wherein the one or more visual indicators provide a visual representation of at least one of the obstacle along the path of the AV and one or more circumstances associated with the event in the environment.

16. The system of claim 13, wherein the map depicts one or more aspects of the environment associated with the AV, wherein the memory includes instructions which, when executed by the one or more processors, cause the one or more processors to:

provide, to the user device, an information section providing at least one of trip information, one or more notifications and a status of one or more AV controls.

17. The system of claim 11, wherein the at least one of the state and the context of the AV is based on the sensor data from the one or more sensors, wherein the one or more sensors comprise at least one of a camera sensor, a light detection and ranging (LIDAR) sensor, a radar sensor, a global positioning system (GPS) sensor, an accelerometer, a motion detection sensor, a speedometer, a light detector, an audio sensor, a braking sensor, an ultrasonic sensor, a position sensor, a steering angle sensor, a steering wheel rotation sensor, a turn signal sensor, a parking sensor, a gear position sensor, a brake light sensor, an odometer, a proximity sensor, a structured-light three-dimensional scanner, an inertial measurement unit, and a temperature sensor, and wherein the memory includes instructions which, when executed by the one or more processors, cause the one or more processors to:

track, based on additional sensor data from the one or more sensors associated with the AV, the at least one of the state and the context of the AV while the AV is en route to the pick-up location; and present, on the map, at least one updated visual indicator of at least one of an updated state and an updated context of the AV, the updated state and the updated context of the AV comprising at least one of an updated location of the AV, an updated behavior of the AV, and one or more conditions in an environment associated with the AV.

18. A non-transitory computer-readable storage medium comprising:

instructions stored on the non-transitory computer-readable storage medium, wherein the instructions, when executed by one or more processors, cause the one or more processors to:

receive a user request from a user device for a ride from an autonomous vehicle (AV), wherein the user request specifies a pick-up location associated with a user;

receive data indicating at least one of a state and a context of the AV while the AV is traveling to the pick-up location;

generate, based on the data indicating the at least one of the state and the context of the AV, one or more visual indicators that indicate the at least one of the state and the context of the AV;

provide a map to the user device depicting the one or more visual indicators of the at least one of the state and the context of the AV, the one or more visual indicators providing a description of at least one of a condition along a route to the pick-up location detected by the AV while traveling to the pick-up location, a response to the condition that the AV is predicted to perform, and a control function that is being performed or has been performed by the AV while traveling to the pick-up location;

determine, based on sensor data from one or more sensors associated with the AV, a change in the at least one of the state and the context of the AV, the change occurring while the AV is traveling to the pick-up location; and provide, to the user device, one or more updated visual indicators identifying the change in the at least one of the state and the context of the AV, wherein the one or more updated visual indicators identify at least one of a status of a turn signal on the AV, a status of a brake light on the AV, a steering wheel rotation measurement of a steering wheel on the AV, and a u-turn operation;

receive a video feed captured by one or more camera sensors on the AV, the video feed depicting a local scene associated with the AV;

identify a parking location for the user to enter the AV;

identify an object in the video feed corresponding to the pick-up location for the user to enter the AV; and provide, to the user device, the video feed and a message identifying the object as the parking location for the user to enter the AV within the pick-up location, wherein the user device concurrently displays the video feed and the message identifying the object as the parking location for the user to enter the AV.

19. The non-transitory computer-readable storage medium of claim 18, wherein the response to the condition or the control function comprise at least one of reversing, parking, braking, turning, activating a turn signal, activating a brake light, and performing a u-turn.

* * * * *